UNITED STATES PATENT OFFICE.

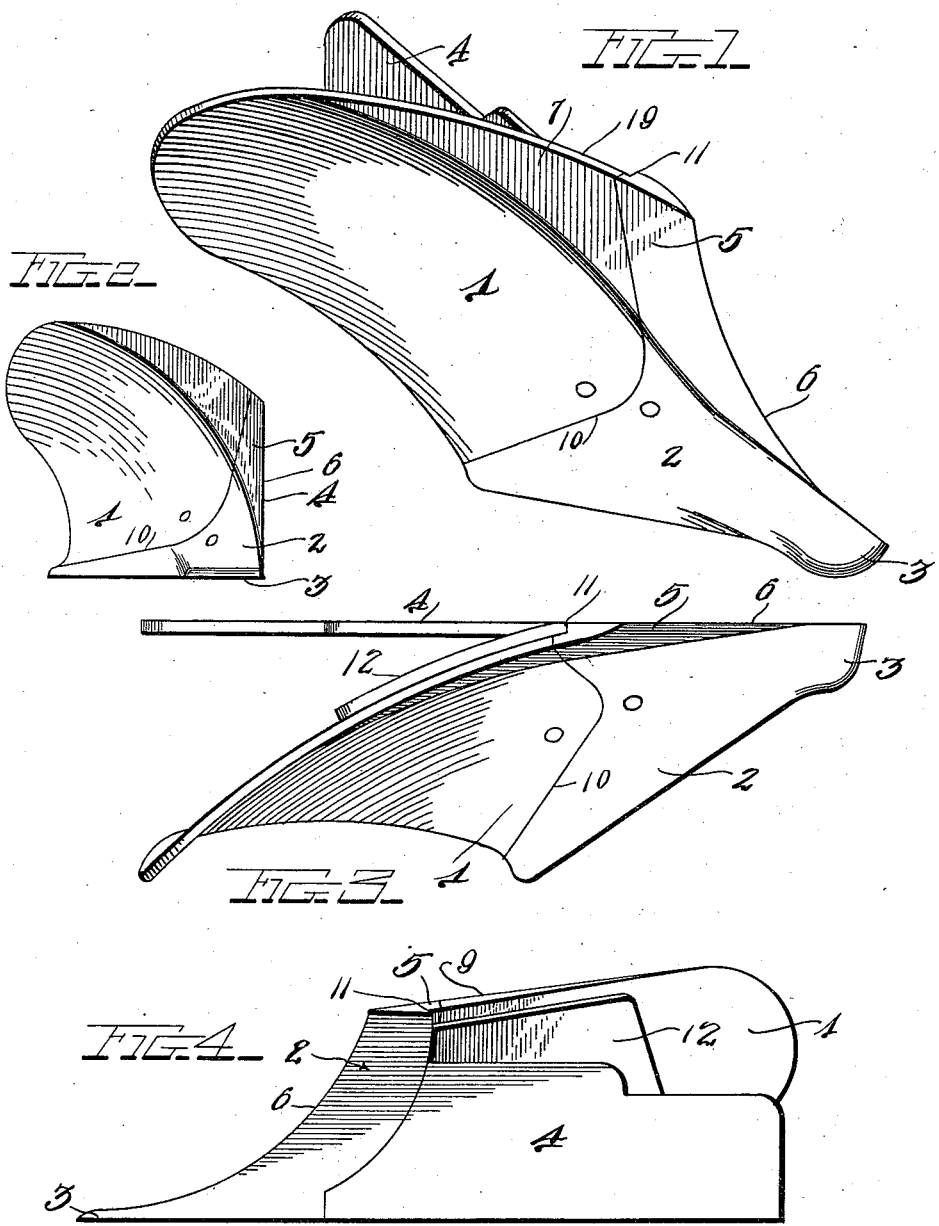

FRANCIS LAFAYETTE EZELL, OF NASHVILLE, TENNESSEE.

PLOW.

1,015,672.              Specification of Letters Patent.        Patented Jan. 23, 1912.

Application filed April 6, 1911. Serial No. 619,301.

*To all whom it may concern:*

Be it known that I, FRANCIS LAFAYETTE EZELL, a citizen of the United States, residing at Nashville, in the county of Davidson and State of Tennessee, have invented certain new and useful Improvements in Plows; and I do declare the following to be a full, clear, and exact description of the invention, such as will enable others skilled in the art to which it appertains to make and use the same.

This invention relates to improvements in plows.

One object of the invention is to provide a plow having a colter with a sharp cutting edge and a body shaped at its rear end to match accurately the front end of the mold board whereby the slices of soil turned up by the share are cut from the land side of the furrow thus greatly facilitating the operation of the plow in turning the soil.

With this and other objects in view the invention consists of certain novel features of construction, combination and arrangement of parts as will be more fully described and particularly pointed out in the appended claim.

In the accompanying drawings:—Figure 1 is a perspective view of the mold board and share of a plow showing the application of my invention; Fig. 2 is a front end view thereof; Fig. 3 is a top plan view; Fig. 4 is a side view of the side of the plow opposite to that shown in Fig. 1.

Referring more particularly to the drawings, the numeral 1 designates the mold board having at its inner end an upright extension 7 curved on its front face as seen in Fig. 1, the numeral 2 designates the share and 3 is its point, the numeral 4 is the land side which, as seen in Fig. 2, preferably stands exactly vertical, and the numeral 5 designates my improved colter which is in effect an upright extension from the inner edge of the share 2, formed at its front with a sharp cutting edge 6 which recedes from the point 3 rearward and upward along the length of the colter, on a curved line as best seen in Fig. 4 to the upper end 8 of said colter which by preference stands flush with the upper edge 9 of the extension 7. The right hand faces of these two members are made flush as clearly seen in Fig. 1, as also are the outside and upper faces of the share 2 and mold board 1, the object obviously being so the earth taken up by the point 3 will pass freely along these faces without placing too great a burden upon the draft animal or animals. In order to preserve the continuity of the faces across the seam or line 10 between them, the rear end or thicker portion of the colter is recessed or shouldered as at 11, and behind the upright extension 7 of the mold board and projecting into this shoulder is a curved brace 12 as best seen in Fig. 3, the brace standing above and being connected with the land side 4 in any suitable way. Just forward of the shoulder 11 the upright portion of the colter 5 is made rather thick at its rear, whence it tapers forward to the cutting edge 6 as shown. The parts when constructed and arranged as hereinbefore described, will effectually cut the soil being turned by the plow from the land, thus causing the plow to make a clean cut and to gather all of the slice of soil and deliver the same to the mold board to be turned thereby. In thus cutting the soil the draft of the plow is considerably lessened and the plowing operation greatly facilitated.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claim.

Having thus described my invention what I claim is:—

In a plow, the combination with the mold board having an upright extension, the land side, and the share and its point; of a colter rising from the inner edge of the share with its outer face flush with that of said extension and its front edge receding from the point rearward and upward and sharpened to a cutting edge and its rear edge formed with an upright shoulder, and a brace secured behind said upright extension with its front end projecting into said shoulder, for the purpose set forth.

In testimony whereof I have hereunto set my hand in presence of two subscribing witnesses.

FRANCIS LAFAYETTE EZELL.

Witnesses:
J. W. SCOTT,
WM. SCOTT.

Copies of this patent may be obtained for five cents each, by addressing the "Commissioner of Patents, Washington, D. C."